(12) United States Patent  (10) Patent No.: US 7,395,597 B2
Shao et al.  (45) Date of Patent: Jul. 8, 2008

(54) OPPOSED CURRENT FLOW MAGNETIC PULSE FORMING AND JOINING SYSTEM

(75) Inventors: Haiping Shao, Dublin, OH (US); Peihui Zhang, Columbus, OH (US)

(73) Assignee: Edison Welding Institute Inc, Columbus, OH (US)

( * ) Notice: Subject to any disclaimer, the term of this patent is extended or adjusted under 35 U.S.C. 154(b) by 699 days.

(21) Appl. No.: 11/061,163

(22) Filed: Feb. 18, 2005

(65) Prior Publication Data

US 2006/0185412 A1 Aug. 24, 2006

(51) Int. Cl.
*B23P 19/00* (2006.01)
*B21D 26/02* (2006.01)
(52) U.S. Cl. ............................................. 29/795; 72/56
(58) Field of Classification Search .................... 29/795, 29/744, 719, 419.2, 421.1; 72/56, 707, 54; 228/107
See application file for complete search history.

(56) References Cited

U.S. PATENT DOCUMENTS

| | | | |
|---|---|---|---|
| 3,252,313 A | 5/1966 | Eilers et al. | |
| 3,347,074 A | 10/1967 | Eilers et al. | |
| 3,391,558 A | 7/1968 | Deeg | |
| 3,412,590 A | 11/1968 | Lippmann | |
| 3,486,356 A | 12/1969 | Brower et al. | |
| 4,143,532 A | 3/1979 | Khimenko et al. | |
| 4,170,887 A | 10/1979 | Baranov | |
| 4,531,393 A | 7/1985 | Weir | |
| 5,824,996 A * | 10/1998 | Kochman et al. | ............ 219/529 |
| 6,229,125 B1 | 5/2001 | Livshiz et al. | |
| 6,868,778 B2 * | 3/2005 | Knoth et al. | ................. 100/214 |
| 7,256,373 B2 * | 8/2007 | Gafri et al. | ................... 219/603 |

OTHER PUBLICATIONS

A. Henselek, M. Beerwald, C. Beerwald. "Design and Adaptation of EMF Equipment-From Direct Acting Multi-turn Coils to Separable Tool Coils for Electromagnetic Tube Compress-".
International Search Report and Written Opinion of the International Searching Authority for International Application No. PCT/US06/05072, mailed Sep. 24, 2007, 7 pages.

* cited by examiner

*Primary Examiner*—John C Hong
(74) *Attorney, Agent, or Firm*—Gallagher & Dawsey Co, LPA; Michael J. Gallagher; David J. Dawsey

(57) ABSTRACT

An opposed current flow magnetic pulse forming and joining system in electrical communication with a magnetic pulse power supply having a positive connection and a negative connection. The system may be used in forming individual workpieces or joining multiple workpieces, including joining by magnetic pulse welding. The system includes a first section, a second section, an insulator, and a first and a second pair of conductors. The first and second sections cooperate to enclose the workpiece(s) and function to create an electromagnetic force similar to that produced by a single closed coil. The system is configured to achieve desirable current flow by minimizing inductance, inductive reactance, and impedance in the conductors. The pairs of conductors may incorporate closely spaced individual conductors, braided conductors, and coaxial conductors. The current flow in the individual conductors of each pair of conductors is opposed, as is the current flow through the sections.

22 Claims, 9 Drawing Sheets

OPPOSED CURRENT FLOW MAGNETIC PULSE FORMING AND JOINING SYSTEM

STATEMENT REGARDING FEDERALLY SPONSORED RESEARCH OR DEVELOPMENT

This invention was not made as part of a federally sponsored research or development project.

TECHNICAL FIELD

The present invention relates to the field of magnetic pulse technologies, namely magnetic pulse forming and magnetic pulse joining, including welding, and related systems and methods. The present invention is an opposed current flow magnetic pulse forming and joining system.

BACKGROUND OF THE INVENTION

The use of magnetic pulse technologies in forming and joining components has been known for years. The widespread use of magnetic pulse forming and joining has been generally limited to use with tubular workpieces of relatively simple geometries. Traditionally, magnetic pulse forming and joining has been accomplished through the use of a closed coil configured such that the parts to be formed or joined can be slid into and out of the coil. Such closed coils have not allowed the application of magnetic pulse technologies to workpieces having anything other than simple shapes.

To overcome the limitations inherent in closed coils, numerous split concentrators have been developed to provide additional flexibility to closed coil devices. Such split concentrator designs are found in U.S. Pat. Nos. 3,486,356, 3,412,590, 3,391,558, and 3,252,313, just to name a few. Still, use of a split concentrator with a closed coil device does not provide the flexibility needed in many situations; after all the formed or welded workpiece must still be able to slide out of the coil.

Others have essentially cut a closed coil device in half so that it can be opened to insert and remove workpieces, yet still create a closed coil when the halves are brought together. Such configurations have been plagued by sparking along the interface between the two sections which leads to premature wear and failure of the coil. Yet another problem plaguing magnetic pulse technology systems has been the lack of control of the current as it passes through the sections. Prior art systems have failed to recognize the importance that the electrical characteristics of the entire system have on the current flow within the sections. A magnetic pulse technology power source may be tens of feet away from the actual forming or joining device. The power transmission systems responsible to transmitting hundreds of thousands of amperes at an electrical potential of thousands of volts are generally the source of several problems. Large power transmission circuits operating at the frequencies used in magnetic pulse forming and joining, generally tens of kHz, produce large inductance loads which negatively impact the operation.

Reducing the inductance in magnetic pulse technology systems is very important for two reasons. First, high inductance in a magnetic pulse system has the effect of reducing the magnitude of the current, which consequently reduces the magnitude of the electromagnetic pulse force. Therefore, by reducing the inductance in a magnetic pulse system, the electromagnetic pulse force can be increased without making any changes to the magnetic pulse power supply, thereby improving the forming or joining of the workpiece(s). Secondly, high inductance in a magnetic pulse system has the effect of reducing the current frequency in the system, which consequently increases the rise time of the magnetic pulse force, which is particularly important in magnetic pulse welding. Therefore, by reducing the inductance in a magnetic pulse system, particularly in the conductors, the rise time of the magnetic pulse force can be reduced, again, without making any changes to the magnetic pulse power supply. Prior magnetic pulse technology systems have not been designed with reduction of inductance of the conductors, and all the associated benefits, in mind. The present system addresses this need.

The field of magnetic pulse forming and welding has needed a design in which multiple individual components can be easily configured around a workpiece in such a manner that each component constitutes a separate electrical circuit, yet when properly installed and operated, the individual components work together to produce the same effect as a single closed coil. While some of the prior art devices attempted to improve the state of the art, none has achieved the unique and novel configurations and capabilities of the present invention. With these capabilities taken into consideration, the instant invention addresses many of the shortcomings of the prior art and offers significant benefits heretofore unavailable.

SUMMARY OF INVENTION

In its most general configuration, the present invention advances the state of the art with a variety of new capabilities and overcomes many of the shortcomings of prior methods in new and novel ways. In its most general sense, the present invention overcomes the shortcomings and limitations of the prior art in any of a number of generally effective configurations.

The present invention includes several systems and methods for performing magnetic pulse forming and joining with improved quality, reliability, and dramatically less losses due to inductance in the conductors. In one of the many preferable configurations, the opposed current flow magnetic pulse forming and joining system of the present invention is in electrical communication with a magnetic pulse power supply having a positive connection and a negative connection. The system may be used in forming an individual workpiece or joining multiple workpieces.

The system generally comprises a first section, a second section, an insulator, and a first and a second pair of conductors. During operation, the first and second sections cooperate to enclose the workpiece, or workpieces, that is to be formed or joined by an electromagnetic force generated by current flowing through the sections. The system is configured so that the first pair of conductors and the second pair of conductors complete a first electrical circuit between the first section and the magnetic pulse power supply and a second electrical circuit between the second section and the magnetic pulse power supply.

The system is configured to achieve desirable current flow throughout the system by minimizing the inductance in the conductors. The desired current flow is through the first section in a direction opposite the current flowing through the second section, while the current flows in opposite directions in each conductor of each pair of conductors. This current flow permits the first and second sections to function as if a single magnetic pulse coil, and the opposed current in the individual conductor pairs greatly reduces inductance in the conductors, affording several benefits not previously found in magnetic pulse systems.

Numerous variations, modifications, alternatives, and alterations of the various preferred embodiments, processes, and methods may be used alone or in combination with one another as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

DETAILED DESCRIPTION OF THE INVENTION

The opposed current flow magnetic pulse forming and joining system 10 of the present invention enables a significant advance in the state of the art. The preferred embodiments of the method and system accomplish this by new and novel methods that are configured in unique and novel ways and which demonstrate previously unavailable but preferred and desirable capabilities. The description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

The present invention includes several systems and methods for performing magnetic pulse forming and joining with improved quality, reliability, and dramatically less losses due to inductance in the conductors. The opposed current flow magnetic pulse forming and joining system 10 is in electrical communication with a magnetic pulse power supply 20 having a positive connection 22 and a negative connection 24, as would be understood by those with skill in the art. The system 10 may be used in forming an individual workpiece or joining multiple workpieces.

Figure 1:
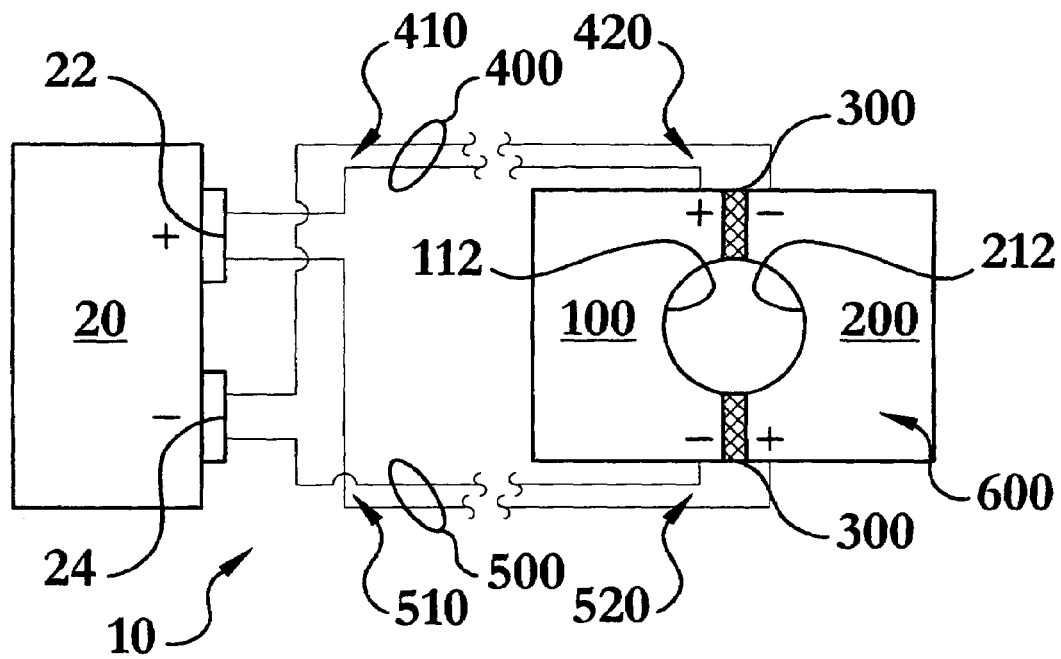
FIG. 1 shows a schematic of one embodiment of the system of the present invention, not to scale.

The system 10 generally comprises a first section 100, a second section 200, an insulator 300, and a first and a second pair of conductors 400, 500, as seen in FIG. 1 in an operational position 600. The system 10 is configured so that the first pair of conductors 400 and the second pair of conductors 500 complete a first electrical circuit between the first section 100 and the magnetic pulse power supply 20 and a second electrical circuit between the second section 200 and the magnetic pulse power supply 20. Further, the system 10 is configured to achieve desirable current flow throughout the system 10 by minimizing the inductance in the conductors. Such desirable current flow is characterized by current flowing through the first section 100 in a direction opposite the current flowing at the second section 200, and the current flowing in opposite directions in each conductor of the first pair of conductors 400, and similarly, current flowing in opposite directions in each conductor of the second pair of conductors 500, as will be described in detail later herein. The desirable current flow permits the first and second sections 100, 200 to function as if a single magnetic pulse coil. The opposed current in the individual conductor pairs 400, 500 greatly reduces inductance in the conductors, affording several benefits not previously found in magnetic pulse systems. Additionally, the use of multiple sections increases the life of the system.

Figure 2:
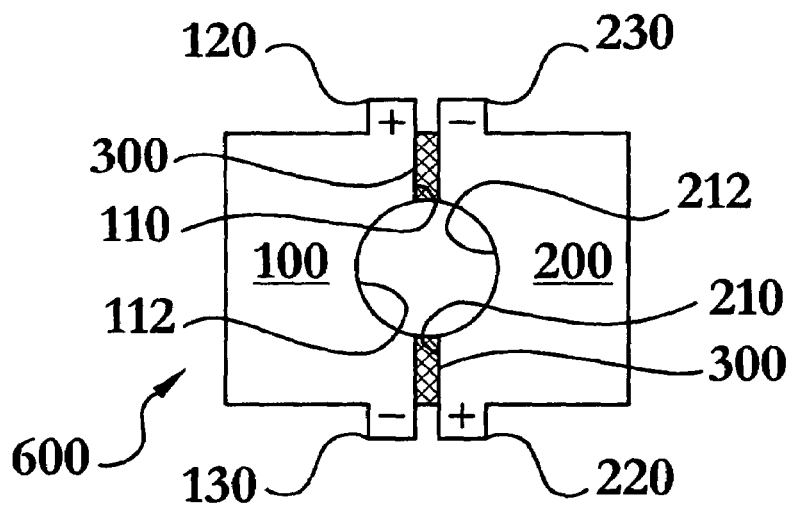
FIG. 2 shows a front elevation view of one embodiment of a portion of the system of the present invention in the operational position, not to scale.
Figure 3:
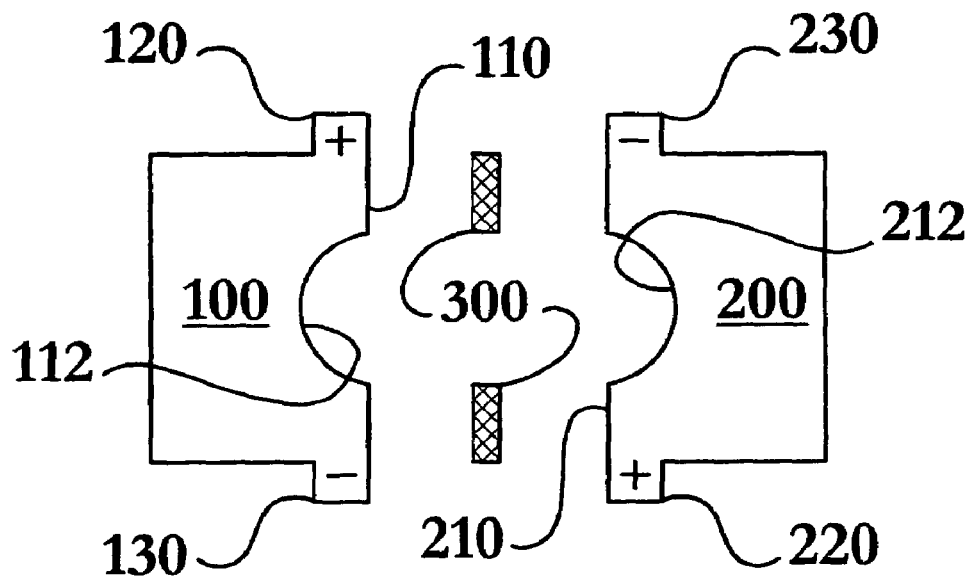
FIG. 3 shows a front elevation view of one embodiment of a portion of the system of the present invention in an open position, not to scale.

Now, a detailed description of each of the elements will begin with the first and second sections 100, 200. As seen in FIGS. 2 and 3, the first section 100 has a first section working face 110 with a first workpiece recess section 112, a positive first section connector 120, and a negative first section connector 130. Similarly, the second section 200 has a second section working face 210 with a second workpiece recess section 212, a positive second section connector 220, and a negative second section connector 230.

The first and second section working faces 110, 210 are referred to as the working faces because these are the surfaces to which it is desirable to direct current passing through each section to achieve a predetermined electromagnetic force. The first working face 110 has a first workpiece recess section 112 and the second working face 210 has a second workpiece recess section 212. When the sections 100, 200 are brought into the operational position 600 the first workpiece recess section 112 is generally adjacent to the second workpiece recess section 212 so as to create a void where the workpiece, or workpieces, labeled WP in FIG. 15, to be formed or joined reside. The recess sections 112, 212 may be shaped to generally conform to the shape of the workpiece, or workpieces, to be formed or joined, or they may be shaped to create a common shape such as a circular recess so that various magnetic pulse field shapers, or concentrators, may be used. The sections 100, 200 are held together during forming and joining by a force system, often a clamping system, capable of withstanding the reaction of the electromagnetic force.

Figure 15:
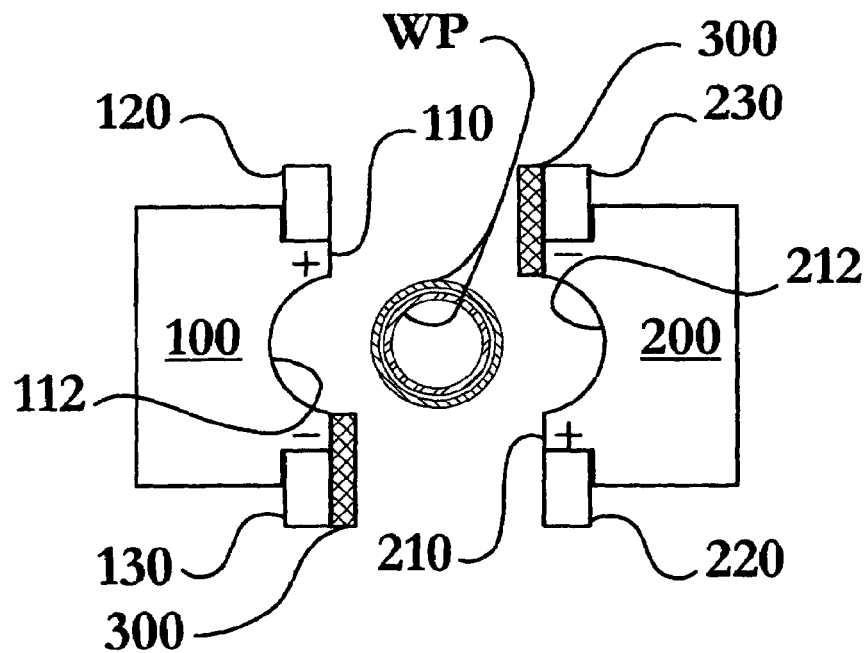
FIG. 15 shows a front elevation view of one embodiment of a portion of the system of the present invention in an open position, not to scale.

As one with skill in the art will appreciate, the positive first section connector 120, negative first section connection 130, positive second section connector 220, and negative second section connector 230 may be either formed as an integral part of the respective sections 100, 200, as seen in FIG. 2, or may be individual parts attached to the respective sections 100, 200, as seen in FIG. 15. Further, the connectors 120, 130, 220, 230 may be little more than a solder joint between the conductors 430, 440, 530, 540 and the sections 100, 200, as schematically illustrated in FIGS. 1 and 7, or may be as simple as lugs to facilitate connecting the conductors 430, 440, 530, 540 to the sections 100, 200, as schematically illustrated in FIGS. 2-6. In one particular embodiment the positive first section connector 120 and the negative first section connector 130 are in contact with a portion of the first section working face 110 and the positive second section connector 220 and the negative second section connector 230 are in contact with a portion of the second section working face 210. Such positioning of the section connectors 120, 130, 220, 230 in contact with the working faces 110, 210 ensures that the current enters each section 100, 200 at the working face 110, 210 and leaves each section 100, 200 at the working face 110, 210. The location of the ingress and egress of the current from the sections 100, 200, as well as the strategic direction of current travel and position of the conductors, is largely determinative of the current path through the sections 100, 200 which affects the magnitude of the electromagnetic force.

The present invention is unique in that it recognizes and takes advantage of electrical principles to maximize the amount of current traveling through the sections 100, 200 either at or near the working faces 110, 210. One with skill in the art will recognize that current always flows along a path of minimum impedance and that the impedance of the present system 10, with the exception of the power supply 20, may be represented by the following equation:

$$Z = R + j\omega L - j1/\omega C$$

In the above equation, Z is impedance, R is resistance, ($\omega L$ is the inductive reactance, and $1/(\omega C)$ is the capacitive reactance. Conventional magnetic pulse joining systems have only looked to optimize the coil, or the elements that make up a split coil, rather than look at the magnetic pulse joining system as a whole. Given this narrow view, the inductive reactance and the capacitive reactance have been ignored and the impedance is simply represented by the resistance. This narrow view leads one to falsely believe that the current will automatically travel through the sections 100, 200 at or near the working faces 110, 210, rather than along the opposite perimeter of the sections 100, 200, because it is the path of least resistance. The present inventors discovered that such a narrow view is inappropriate because the current does not naturally travel along the working faces 110, 210 in conventional systems, thereby dramatically reducing the effectiveness of the system.

Figure 16:
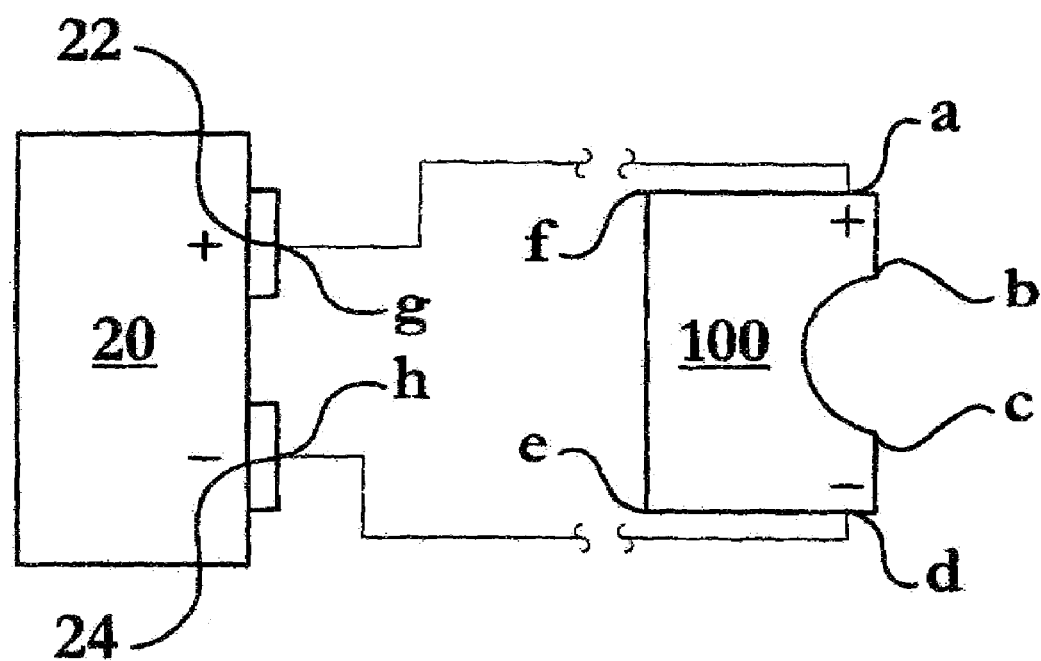
FIG. 16 shows a schematic of one embodiment of the system of the present invention, not to scale.

The present inventors realized that while capacitive reactance may be ignored, inductive reactance may not be ignored. For instance, if the sections 100, 200 of FIG. 2 were simply connected to the magnetic pulse power supply 20 with individual conductors paying no attention to the current flow in the conductors nor the position of the conductors with respect to one another, then the current flow through the sections 100, 200 would not be near the working faces 110, 210, but rather along the outer perimeter. For example, FIG. 16 represents one half of a conventional split component magnetic pulse joining system. In such configurations the inductive reactance in the electrical loop designated by nodes g-a-b-c-d-h is higher than the inductive reactance of the electrical loop designated by nodes g-a-f-e-d-h, while the resistance of the g-a-b-c-d-h loop is lower than the resistance of the g-a-f-e-d-h loop. The higher inductive reactance more than offsets the lower resistance resulting in the total impedance (Z) of the g-a-b-c-d-h loop being higher than the impedance of the g-a-f-e-d-h loop. Therefore the current travels along the g-a-f-e-d-h loop, which is not the desired path. The present inventors have numerically modeled this system and the model confirms the g-a-f-e-d-h current path.

The present invention introduces a unique relationship between the direction of current travel in the conductors and the proximity of certain conductors with respect to one another such that the current travels along the working faces of the sections, represented by nodes a-b-c-d in FIG. 16, rather along the opposite perimeter of the sections, represented by nodes a-f-e-d in FIG. 16. Such realization of the importance of the inductive reactance in magnetic pulse joining systems allows capabilities that were previously unobtainable. The selective configuration of the conductors as well as the direction of current travel in the conductors claimed in the present invention reduces the inductance, and therefore the inductive reactance, in the system such that the path of minimum impedance is along the working faces 110, 210.

Figure 4:
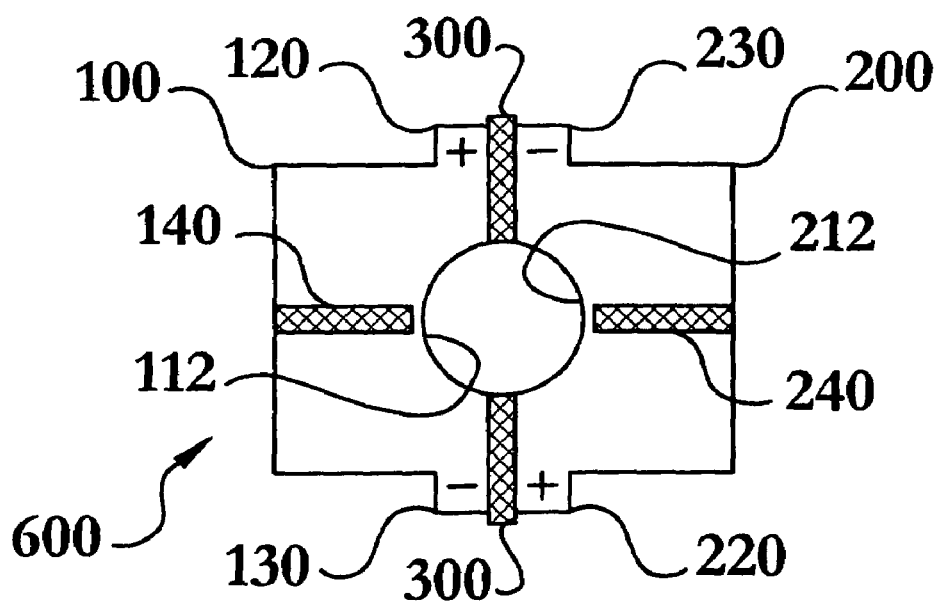
FIG. 4 shows a front elevation view of one embodiment of a portion of the system of the present invention in the operational position, not to scale.
Figure 5:
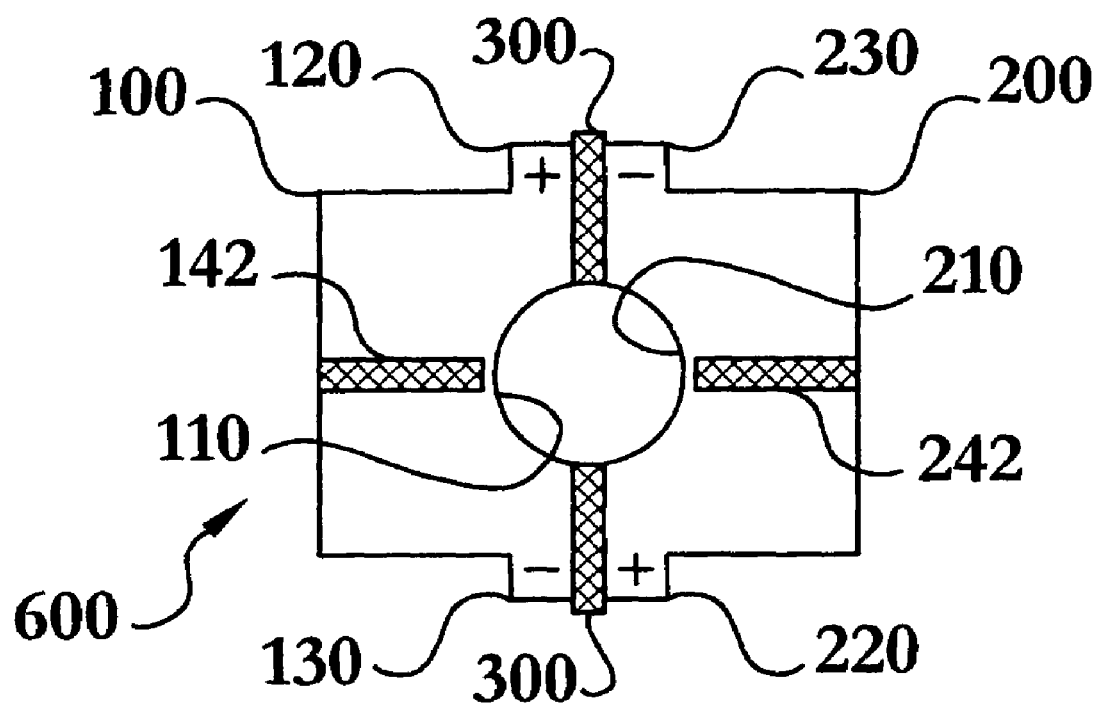
FIG. 5 shows a front elevation view of one embodiment of a portion of the system of the present invention in the operational position, not to scale.
Figure 6:
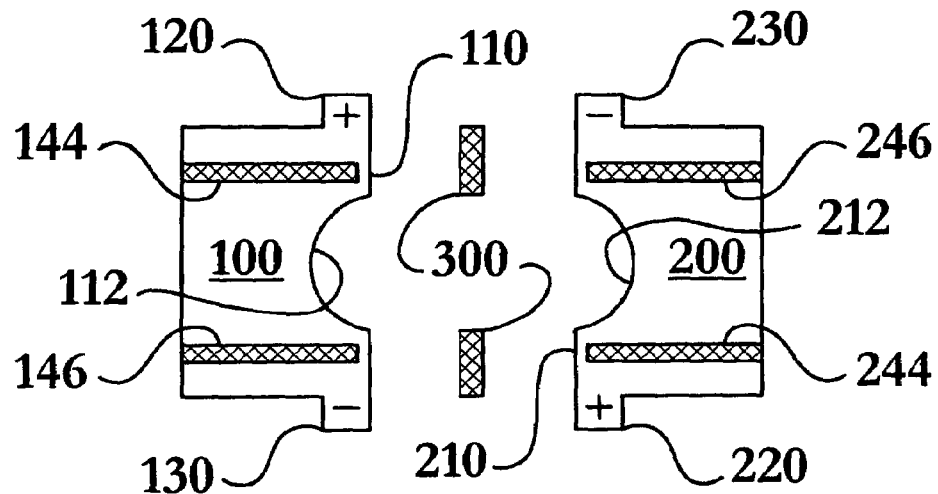
FIG. 6 shows a front elevation view of one embodiment of a portion of the system of the present invention in the operational position, not to scale.
Figure 7:
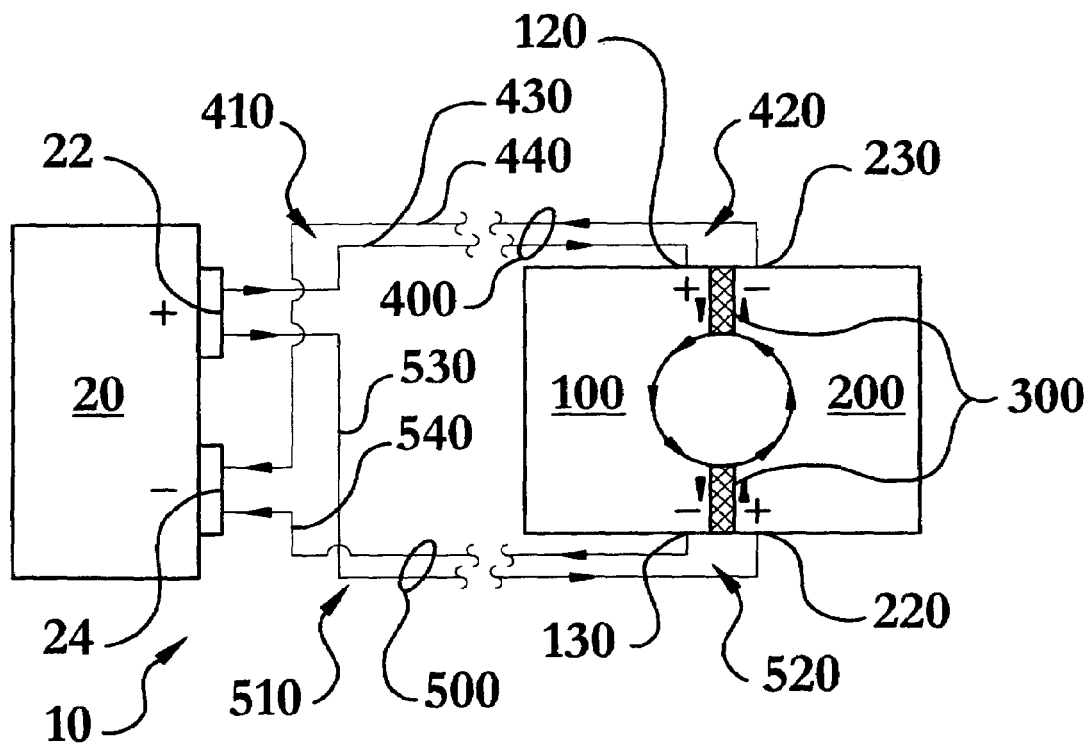
FIG. 7 shows a schematic of one embodiment of the system of the present invention, not to scale.

While the very nature of the present invention ensures that majority of the current passing through the sections is at, or near, the working faces 110, 210, additional embodiments seen in FIGS. 4-6 may further direct stray current within the individual sections 100, 200. The first section 100 may include at least one first section current path control device 140 and the second section 200 may include at least one second section current path control device 240 to direct stray current in a manner preferential to forming and joining, as seen in FIG. 4. The preferential current path may be different in different applications, but generally it is preferential to direct the current as close to the working faces 110, 210 as possible. The current path control devices 140, 240 may take any number of forms but may be an insulating barrier. Such insulating barriers 142, 242 are illustrated in FIG. 5 and generally extend toward the working faces 110, 210, but stop just short of the face 110, 210 so that the stray current must pass between the insulating barriers 142, 242 and working faces 110, 210. In a preferred embodiment shown in FIG. 6, the first insulating barrier 142 comprises a first ingress barrier 144 and a first egress barrier 146 wherein the first ingress barrier 144 directs current to the portion of the first section working face 110 between the positive first section connector 120 and the first workpiece recess section 112 and the first egress barrier 146 directs current to the portion of the first section working face 110 between the first workpiece recess section 112 and the negative first section connector 130. Similarly, in this embodiment, the second insulating barrier 242 comprises a second ingress barrier 244 and a second egress barrier 246 wherein the second ingress barrier 244 directs stray current to the portion of the second section working face 210 between the positive second section connector 220 and the second workpiece recess section 212 and the second egress barrier 246 directs current to the portion of the second section working face 210 between the second workpiece recess section 212 and the negative second section connector 230.

The selection of the materials of construction of the sections 100, 200, connectors 120, 130, 220, 230, and current path control devices 140, 240 is within the capability of one with skill in the art. Obviously, the sections 100, 200 and the connectors 120, 130, 220, 230 must be electrically conductive and strong enough to withstand the reaction forces associated with creating the desired electromagnetic force. Alternatively, the current path control devices 140, 240 must not be electrically conductive in order to direct the stray current path within the sections 100, 200.

Referring again to FIG. 2, in the operational position 600 the insulator 300 is in contact with a portion of the first section working face 110 and the second section working face 210. The insulator 300 blocks current flow between the first section 100 and the second section 200. The insulator 300 is not permanently attached to either section 100, 200, but may be attached in one of the embodiments to reduce the number of loose elements during the ingress and egress of the workpiece (s). Additionally, the insulator 300 may be a single element or it may be composed of multiple sections, as illustrated in FIG. 15.

The system 10 includes two pairs of conductors 400, 500, each pair having a conductor A 430, 530 and a conductor B 440, 540, as seen in FIG. 7. As will be explained herein, the individual A conductors 430, 530 are be placed in close proximity to their associated individual B conductor 440, 540, which may include the conductors being a twisted pair, or braided, or coaxial. The first pair of conductors 400 has a first distal end 410 and a first proximal end 420 and has its first conductor A 430 in close proximity to the first conductor B 440. The first distal end 410 is in electrical communication with the magnetic pulse power supply 20 and the first proximal end 420 is in electrical communication with the first section 100 and the second section 200. Similarly, the second pair of conductors 500 has a second distal end 510 and a second proximal end 520 and has its second conductor A 530 in close proximity to the second conductor B 540. The second distal end 510 is in electrical communication with the magnetic pulse power supply 20 and the second proximal end 520 in electrical communication with the first section 100 and the second section 200.

The close proximity of the first conductor A 430 to the first conductor B 440, as well as the close proximity of the second conductor A 530 to the second conductor B 540, combined with the opposed current flow relationship between the A conductors 430, 530 and the B conductors 440, 540 reduces the inductance in the conductors, and therefore the inductive reactance and impedance as previously described. In addition to the reasons set forth above, reducing the inductance in magnetic pulse technology systems is very important for two reasons. First, high inductance in the conductors of a magnetic pulse system has the effect of reducing the magnitude of the current, which consequently reduces the magnitude of the magnetic pulse force. Therefore, by reducing the inductance in the conductors, the electromagnetic pulse force can be increased without making any changes to the magnetic pulse power supply 20, thereby improving the forming or joining of the workpiece(s). Secondly, high inductance in the conductors has the effect of reducing the current frequency in the system which consequently increases the rise time of the electromagnetic force. Therefore, by reducing the inductance in a magnetic pulse system, particularly in the conductors, the magnitude of the current is increased and the rise time of the electromagnetic force can be reduced without making any changes to the magnetic pulse power supply 20, thereby improving the forming or joining of the workpiece(s).

With reference now to FIG. 7, when the system 10 is in a operational position 600 with the first section working face 110 substantially parallel with the second section working face 210 and a portion of each working face 110, 210 is in contact with the insulator 300, the first pair of conductors 400 and the second pair of conductors 500 are configured to complete a first electrical circuit between the first section 100 and the magnetic pulse power supply 20 and a second electrical circuit between the second section 200 and the magnetic pulse power supply 20. This configuration ensures that the current flowing at the first section working face 110 is in a direction opposite the current flowing at the second section working face 210, and the current flowing in the first conductor A 430 is in a direction opposite the current flowing in the first conductor B 440 and the current flowing in the second conductor A 530 is in a direction opposite the current flowing in the second conductor B 540, as shown by the flow arrows in the figures indicating the direction of the current travel.

Four illustrative embodiments of the above configuration are found in FIGS. 7-11. In the first illustrative embodiment, seen in FIG. 7, (a) the first conductor A 430 is in electrical communication with the positive first section connector 120 and the magnetic pulse power supply positive connection 22, (b) the first conductor B 440 is in electrical communication with the negative second section connector 230 and the magnetic pulse power supply negative connection 24, (c) the second conductor A 530 is in electrical communication with the positive second section connector 220 and the magnetic pulse power supply positive connection 22, and (d) the second conductor B 540 is in electrical communication with the negative first section connector 130 and the magnetic pulse power supply negative connection 24. In all of these four illustrative embodiments of FIGS. 7-10 the operational position the positive first section connector 120 is adjacent to the negative second section connector 230 and is separated therefrom by a portion of the insulator 300 and the positive second section connector 220 is adjacent to the negative first section connector 130 and is separated therefrom by a portion of the insulator 300. In this first illustrative embodiment of FIG. 7, the current traverses from the magnetic pulse power supply 20 to the positive first section connector 120 through the first conductor A 430, passes through the first section 100, and returns to the magnetic pulse power 20 supply through the second conductor B 540 and current traverses from the magnetic pulse power supply 20 to the positive second section connector 220 through the second conductor A 530, passes through the second section 200, and returns to the magnetic pulse power supply 20 through the first conductor B 440. Therefore, the current flowing at the first section working face 110 is in a direction opposite the current flowing at the second section working face 210, the current flowing through the first conductor A 430 is in the opposite direction of the current flowing through the first conductor B 440, and the current flowing through the second conductor A 530 is in the opposite direction of the current flowing through the second conductor B 540 to minimize the inductance in the conductors, as is also true in the embodiments of FIGS. 8-10.

Figure 8:
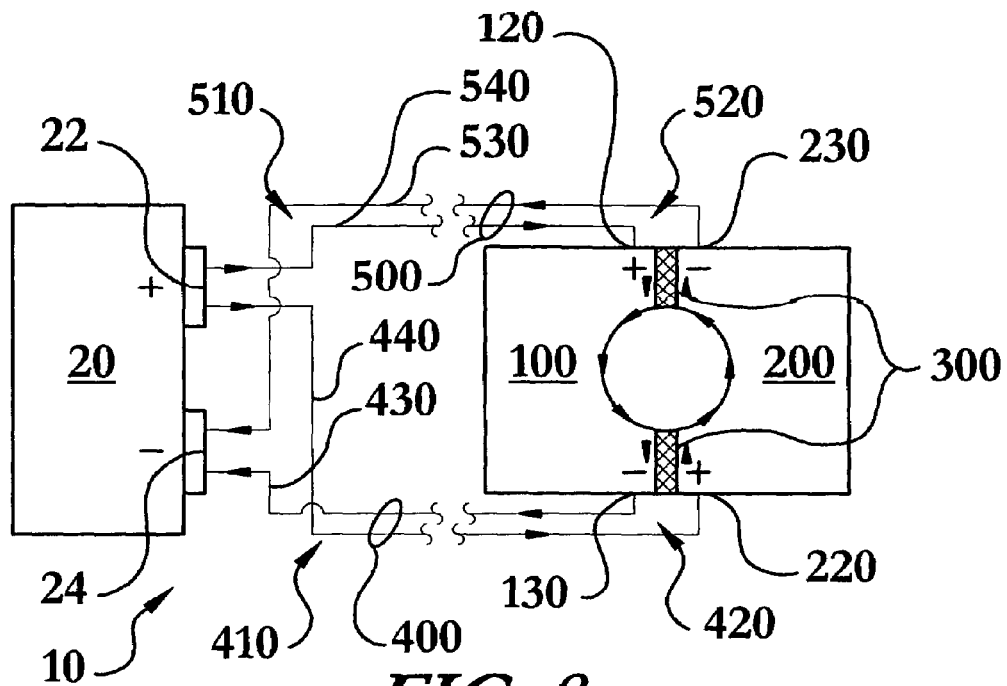
FIG. 8 shows a schematic of one embodiment of the system of the present invention, not to scale.

In the second illustrative embodiment, seen in FIG. 8, (a) the first conductor A 430 is in electrical communication with the negative first section connector 130 and the magnetic pulse power supply negative connection 24, (b) the first conductor B 440 is in electrical communication with the positive second section connector 220 and the magnetic pulse power supply positive connection 22, (c) the second conductor A 530 is in electrical communication with the negative second section connector 230 and the magnetic pulse power supply negative connection 24, and (d) the second conductor B 540 is in electrical communication with the positive first section connector 120 and the magnetic pulse power supply positive connection 22. In this second illustrative embodiment, current traverses from the magnetic pulse power supply 20 to the positive first section connector 120 through the second conductor B 540, passes through the first section 100, and returns to the magnetic pulse power supply 20 through the first conductor A 430 and current traverses from the magnetic pulse power supply 20 to the positive second section connector 220 through the first conductor B 530, passes through the second section 200, and returns to the magnetic pulse power supply 20 through the second conductor A 530.

Figure 9:
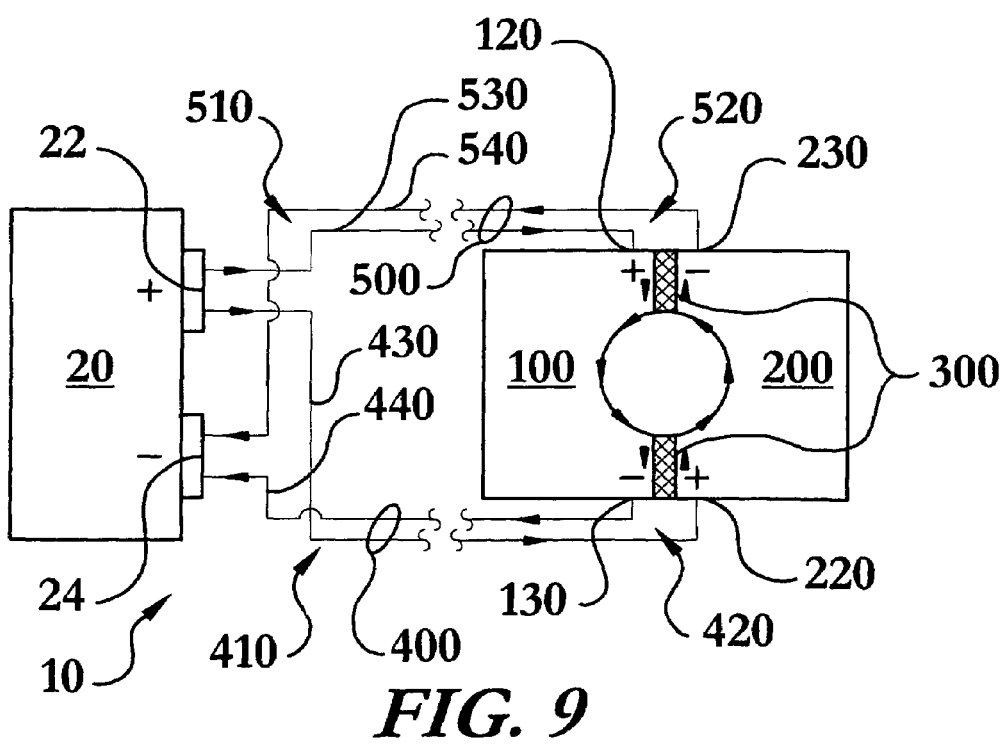
FIG. 9 shows a schematic of one embodiment of the system of the present invention, not to scale.

In the third illustrative embodiment, seen in FIG. 9, (a) the first conductor A 430 is in electrical communication with the positive second section connector 220 and the magnetic pulse power supply positive connection 22, (b) the first conductor B 440 is in electrical communication with the negative first section connector 130 and the magnetic pulse power supply negative connection 24, (c) the second conductor A 530 is in electrical communication with the positive first section connector 120 and the magnetic pulse power supply positive connection 22, and (d) the second conductor B 540 is in electrical communication with the negative second section connector 230 and the magnetic pulse power supply negative connection 24. In this third illustrative embodiment, current traverses from the magnetic pulse power supply 20 to the positive first section connector 120 through the second conductor A 530, passes through the first section 100, and returns to the magnetic pulse power supply 20 through the first conductor B 440 and current traverses from the magnetic pulse power supply 20 to the positive second section connector 220 through the first conductor A 430, passes through the second section 200, and returns to the magnetic pulse power supply 20 through the second conductor B 540.

Figure 10:
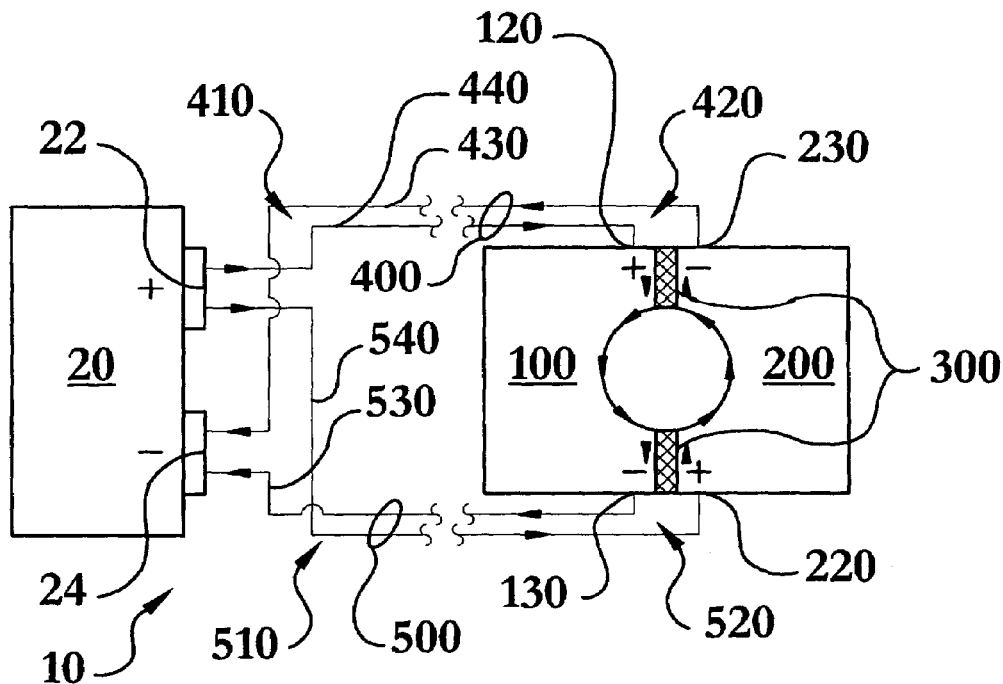
FIG. 10 shows a schematic of one embodiment of the system of the present invention, not to scale.
Figure 11:
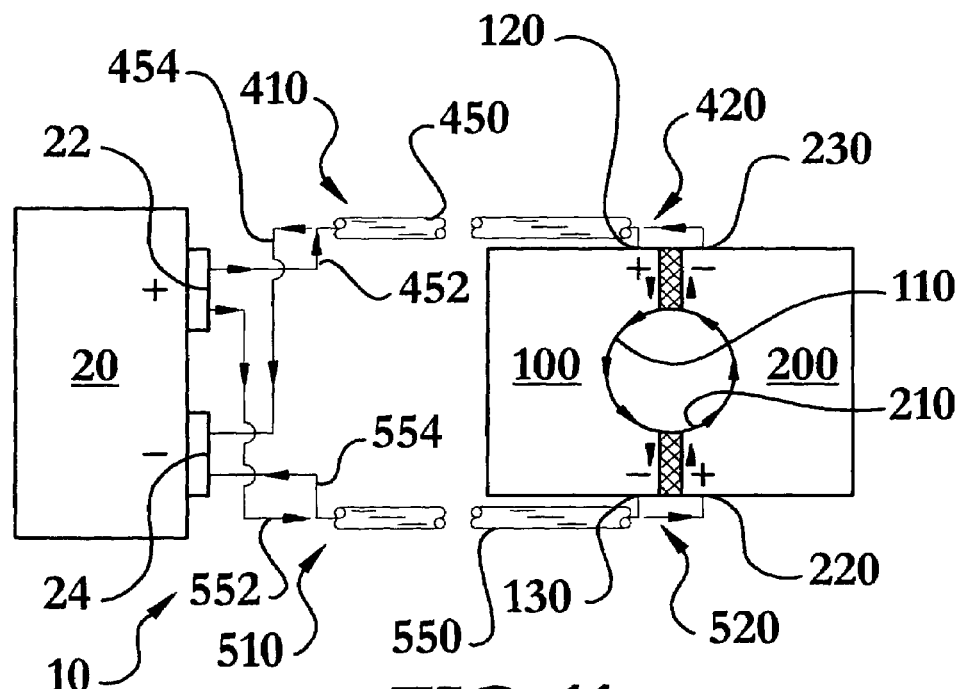
FIG. 11 shows a schematic of one embodiment of the system of the present invention, not to scale.

In the fourth and final illustrative embodiment, as seen in FIG. 10, (a) the first conductor A 430 is in electrical communication with the negative second section connector 230 and the magnetic pulse power supply negative connection 24, (b) the first conductor B 440 is in electrical communication with the positive first section connector 120 and the magnetic pulse power supply positive connection 22, (c) the second conductor A 530 is in electrical communication with the negative first section connector 130 and the magnetic pulse power supply negative connection 24, and (d) the second conductor B 540 is in electrical communication with the positive second section connector 220 and the magnetic pulse power supply positive connection 22. In this fourth illustrative embodiment, current traverses from the magnetic pulse power supply 20 to the positive first section connector 120 through the first conductor B 440, passes through the first section 100, and returns to the magnetic pulse power supply 20 through the second conductor A 530 and current traverses from the magnetic pulse power supply 20 to the positive second section connector 220 through the second conductor B 540, passes through the second section 200, and returns to the magnetic pulse power supply 20 through the first conductor A 430.

The inductance associated with the conductors 430, 440, 530, 540 is reduced the closer the opposed current flow inductors 430 & 440, 530 & 540 are to one another. Therefore, in one particular embodiment the first conductor A 430 is within approximately one inch of the first conductor B 440 throughout substantially the length from the first distal end 410 to the first proximal end 420, and the second conductor A 530 is within approximately one inch of the second conductor B 540 throughout substantially the length from the second distal end 510 to the second proximal end 520. In a further embodiment the first conductor A 430 is substantially in contact with the first conductor B 440 throughout substantially the length from the first distal end 410 to the first proximal end 420, and the second conductor A 530 is substantially in contact with the second conductor B 540 throughout substantially the length from the second distal end 510 to the second proximal end 520. In this particular embodiment the A conductors 430, 530 may not be in contact with the B conductors 440, 540 near the distal 410, 510 and proximal ends 420, 520 to allow for connection to the sections 100, 200 and the power supply 20. As one with skill in the art will recognize, the first 400 and second 500 pair of conductors may be what are commonly referred to as braided conductors, or cables. Further, one skilled in the art will recognize that the figures are schematic in nature and that distances from the distal ends 410, 510 to the proximal ends 420, 520 may be many tens of feet, while the distance that the conductors 430, 440, 530, 540 separate to facilitate connection to the magnetic pulse power supply positive and negative connections 22, 24, or to the respective sections 100, 200, will be the absolute minimum necessary to make the connections, generally less than two feet. Additionally, one skilled in the art will understand that the conductors may include an exterior protection sheath, and therefore reference to the conductors being in contact may mean that the exterior protective sheathes are in contact.

In yet a further variation of the conductors 400, 500, the first pair of conductors 400 is a first coaxial conductor 450 and the second pair of conductors 500 is a second coaxial conductor 550, as seen in FIGS. 11-14. In the first coaxial conductor 450 the first conductor A 430 is a first interior conductor 452 and the first conductor B 440 is a first exterior conductor 454. Similarly, in the second coaxial conductor 550 the second conductor A 530 is a second interior conductor 552 and the second conductor B 540 is a second exterior conductor 554. Consistent with previous embodiments, the current flowing in the first interior conductor 452 is in a direction opposite the current flowing in the first exterior conductor 454 and the current flowing in the second interior conductor 552 is in a direction opposite the current flowing in the second exterior conductor 554 to minimize the inductance in the conductors. Therefore, in this embodiment, not only are the opposed current flow conductors 452 & 454, 552 & 554 in close proximity to one another throughout most of the length from the distal end 410, 510 to the proximal end 420, 520, the exterior conductor 454, 554 surrounds the interior conductor 452, 552, thereby further reducing the inductance in the conductors and eliminating the tendency of separate individual conductors to "jump" or repel one another due to their creation of electromagnetic fields. In essence, the coaxial conductors 450, 550 are self-constrained. Further, as previously explained, the opposed current flow in the first section working face 110 and the second section working face 210 serves to produce an electromagnetic force similar to that of a single closed coil and the opposed current flow in the individual conductors 452, 454, 552, 554 of the first and second coaxial conductors 450, 550 reduces the inductance in the system 10 attributable to the conductors 450, 550.

Four illustrative coaxial embodiments are found in FIGS. 11-14, similar to the four illustrative embodiments previously described regarding non-coaxial embodiments. In the first illustrative embodiment, seen in FIG. 11, (a) the first interior conductor 452 is in electrical communication with the positive first section connector 120 and the magnetic pulse power supply positive connection 22, (b) the first exterior conductor 454 is in electrical communication with the negative second section connector 230 and the magnetic pulse power supply negative connection 24, (c) the second interior conductor 552 is in electrical communication with the positive second section connector 220 and the magnetic pulse power supply positive connection 22, and (d) the second exterior conductor 454 is in electrical communication with the negative first section connector 130 and the magnetic pulse power supply negative connection 24. In each of the embodiments illustrated in FIGS. 11-14 the positive first section connector 120 is adjacent to the negative second section connector 230 and is separated therefrom by a portion of the insulator 300, and the positive second section connector 220 is adjacent to the negative first section connector 130 and is separated therefrom by a portion of the insulator 300. In this embodiment current traverses from the magnetic pulse power supply 20 to the positive first section connector 120 through the first interior conductor 452, passes through the first section 100, and returns to the magnetic pulse power supply 20 through the second exterior conductor 554, and current traverses from the magnetic pulse power supply 20 to the positive second section connector 220 through the second interior conductor 552, passes through the second section 200, and returns to the magnetic pulse power supply 20 through the first exterior conductor 454. Therefore, in this embodiment, and all of those of FIGS. 11-14, the current flowing at the first section working face 110 is in a direction opposite the current flowing at the second section working face 220, the current flowing through the first interior conductor 452 is in the opposite direction of the current flowing through the first exterior conductor 454, and the current flowing through the second interior conductor 552 is in the opposite direction of the current flowing through the second exterior conductor 554 to minimize the inductance in the conductors.

Figure 12:
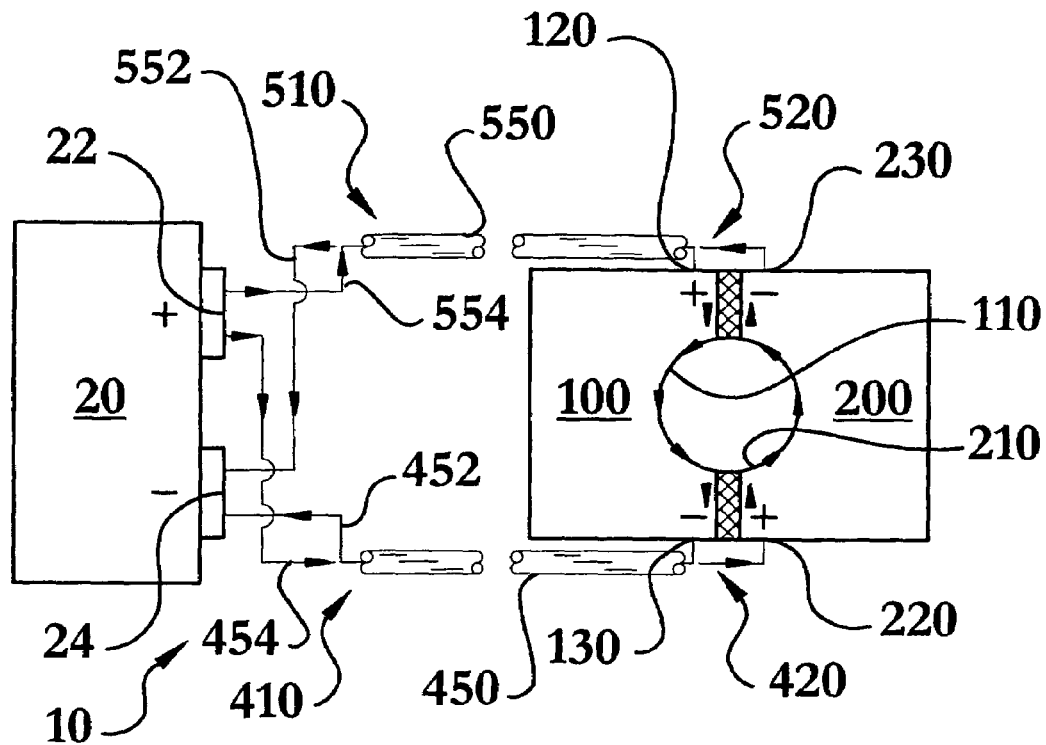
FIG. 12 shows a schematic of one embodiment of the system of the present invention, not to scale.

In the second illustrative embodiment, seen in FIG. 12, (a) the first interior conductor 452 is in electrical communication with the negative first section connector 130 and the magnetic pulse power supply negative connection 24, (b) the first exterior conductor 454 is in electrical communication with the positive second section connector 220 and the magnetic pulse power supply positive connection 22, (c) the second interior conductor 552 is in electrical communication with the negative second section connector 230 and the magnetic pulse power supply negative connection 24, and (d) the second exterior conductor 554 is in electrical communication with the positive first section connector 120 and the magnetic pulse power supply positive connection 22. In this embodiment current traverses from the magnetic pulse power supply 20 to the positive first section connector 120 through the second exterior conductor 554, passes through the first section 100, and returns to the magnetic pulse power supply 20 through the first interior conductor 452, and current traverses from the magnetic pulse power supply 20 to the positive second section connector 220 through the first exterior conductor 454, passes through the second section 200, and returns to the magnetic pulse power supply 20 through the second interior conductor 552.

Figure 13:
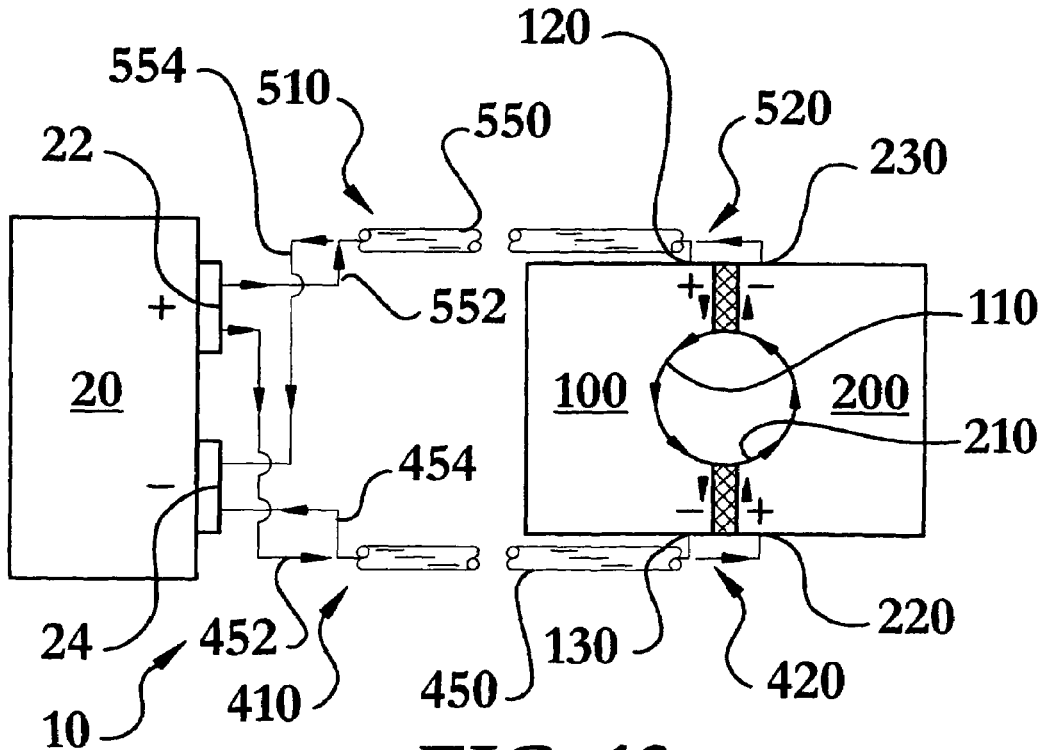
FIG. 13 shows a schematic of one embodiment of the system of the present invention, not to scale.

In the third illustrative embodiment, seen in FIG. 13, (a) the first interior conductor 452 is in electrical communication with the positive second section connector 220 and the magnetic pulse power supply positive connection 22, (b) the first exterior conductor 454 is in electrical communication with the negative first section connector 130 and the magnetic pulse power supply negative connection 24, (c) the second interior conductor 552 is in electrical communication with the positive first section connector 120 and the magnetic pulse power supply positive connection 22, and (d) the second exterior conductor 554 is in electrical communication with the negative second section connector 230 and the magnetic pulse power supply negative connection 24. In this embodiment the current traverses from the magnetic pulse power supply 20 to the positive first section connector 120 through the second interior conductor 552, passes through the first section 100, and returns to the magnetic pulse power supply 20 through the first exterior conductor 454, and current traverses from the magnetic pulse power supply 20 to the positive second section connector 220 through the first interior conductor 452, passes through the second section 200, and returns to the magnetic pulse power supply 20 through the second exterior conductor 554.

Figure 14:
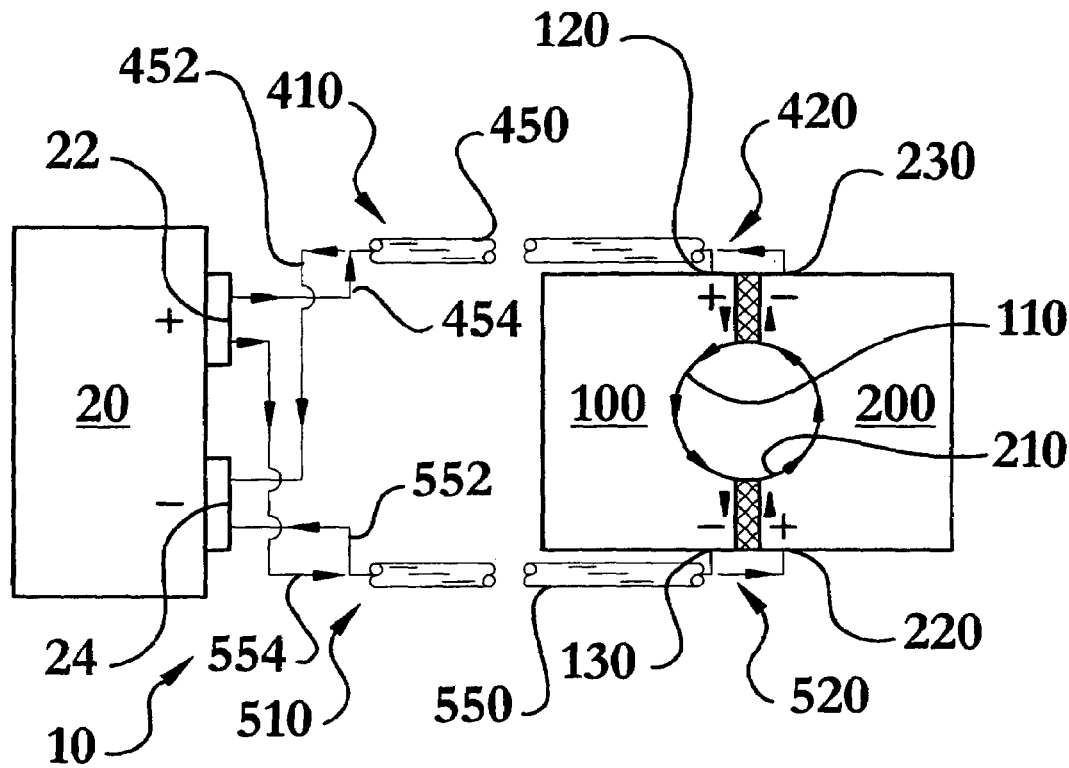
FIG. 14 shows a schematic of one embodiment of the system of the present invention, not to scale.

In the fourth illustrative embodiment, seen in FIG. 14, (a) the first interior conductor 452 is in electrical communication with the negative second section connector 230 and the magnetic pulse power supply negative connection 24, (b) the first exterior conductor 454 is in electrical communication with the positive first section connector 130 and the magnetic pulse power supply positive connection 22, (c) the second interior conductor 552 is in electrical communication with the negative first section connector 130 and the magnetic pulse power supply negative connection 24, and (d) the second exterior conductor 554 is in electrical communication with the positive second section connector 220 and the magnetic pulse power supply positive connection 22. In this embodiment the current traverses from the magnetic pulse power supply 20 to the positive first section connector 120 through the first exterior conductor 454, passes through the first section 100, and returns to the magnetic pulse power supply 20 through the second interior conductor 552, and the current traverses from the magnetic pulse power supply 20 to the positive second section connector 220 through the second exterior conductor 554, passes through the second section 200, and returns to the magnetic pulse power supply 20 through the first interior conductor 452.

The magnetic pulse power supply 20 of the present invention is well known to those with skill in the art. Magnetic pulse power supplies generally include a plurality of high-capacity capacitors and the requisite charging and control circuitry to generate and control the discharge of large quantities of current at high electrical potential for a very short duration. While the description herein refers to a single magnetic pulse power supply 20, one with skill in the art will recognize that each section 100, 200 may have its own magnetic pulse power supply provided they are simultaneously controlled.

One with skill in the art will recognize that in yet a further embodiment the first section 100 and the second section 200 may incorporate, or be constructed of, actual electromagnetic coils. The sections 100, 200 may be multiple-turn or single-turn coils.

Numerous alterations, modifications, and variations of the preferred embodiments disclosed herein will be apparent to those skilled in the art and they are all anticipated and contemplated to be within the spirit and scope of the instant invention. For instance, while the disclosure herein always refers to two sections, one with skill in the art will appreciate that this invention may be constructed with more than two sections and the same principles regarding reduction in inductance due to the conductors apply. Additionally, given the large quantity of current required to perform magnetic pulse forming and joining, one with skill in the art will recognize that the present invention anticipates using more than just two pairs of conductors. In fact the present inventors' experimentation has included as many as six coaxial conductors. Generally, the inductance and resistance attributable to the conductors tends to decrease as the number of conductors increases. Additionally, while magnetic pulse forming and joining are referred to herein, one with skill in the art will recognize that the present invention may also be used in magnetic pulse cutting and all types of magnetic pulse metal working. Further, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

We claim:

1. An opposed current flow magnetic pulse forming and joining system in electrical communication with a magnetic pulse power supply having a positive connection and a negative connection for forming or joining a workpiece or workpieces in which a portion of the system may be separated from the remainder of the system to facilitate ingress and egress of the workpiece or workpieces, comprising:

a first section having a first section working face with a first workpiece recess section, a positive first section connector, and a negative first section connector;

a second section having a second section working face with a second workpiece recess section, a positive second section connector, and a negative second section connector;

an insulator in contact with a portion of the first section working face and the second section working face, the insulator blocking current flow between the first section and the second section and being releasable so that the first section, the insulator, and the second section may be moved independently and separated from one another to allow ingress of the workpiece or workpieces into the area bounded by the first workpiece recess section and the second workpiece recess section;

a first pair of conductors having a first distal end and a first proximal end and having a first conductor A in close proximity to a first conductor B, the first distal end in electrical communication with the magnetic pulse power supply and the first proximal end in electrical communication with the first section and the second section;

a second pair of conductors having a second distal end and a second proximal end and having a second conductor A in close proximity to a second conductor B, the second distal end in electrical communication with the magnetic pulse power supply and the second proximal end in electrical communication with the first section and the second section; and wherein when the system is in a operational position with the first section working face substantially parallel with the second section working face and a portion of each working face is in contact with the insulator, the first pair of conductors and the second pair of conductors are configured to complete a first electrical circuit between the first section and the magnetic pulse power supply and a second electrical circuit between the second section and the magnetic pulse power supply such that current flowing at the first section working face is in a direction opposite the current flowing at the second section working face, and the current flowing in the first conductor A is in a direction opposite the current flowing in the first conductor B and the current flowing in the second conductor A is in a direction opposite the current flowing in the second conductor B to minimize the inductance in the conductors and generate an electromagnetic force from the first and second workpiece recess sections that may be used in magnetic pulse forming and joining.

2. The system of claim 1, wherein the positive first section connector and the negative first section connector are in contact with a portion of the first working face and the positive second section connector and the negative second section connector are in contact with a portion of the second working face.

3. The system of claim 1, wherein the first conductor A is in electrical communication with the positive first section connector and the magnetic pulse power supply positive connection, the first conductor B is in electrical communication with the negative second section connector and the magnetic pulse power supply negative connection, the second conductor A is in electrical communication with the positive second section connector and the magnetic pulse power supply positive connection, and the second conductor B is in electrical communication with the negative first section connector and the magnetic pulse power supply negative connection, wherein in the operational position the positive first section connector is adjacent to the negative second section connector and is separated therefrom by a portion of the insulator and the positive second section connector is adjacent to the negative first section connector and is separated therefrom by a portion of the insulator, such that as current traverses from the magnetic pulse power supply to the positive first section connector through the first conductor A, passes through the first section, and returns to the magnetic pulse power supply through the second conductor B and as current traverses from the magnetic pulse power supply to the positive second section connector through the second conductor A, passes through the second section, and returns to the magnetic pulse power supply through the first conductor B, such that the current flowing at the first section working face is in a direction opposite the current flowing at the second section working face, the current flowing through the first conductor A is in the opposite direction of the current flowing through the first conductor B, and the current flowing through the second conductor A is in the opposite direction of the current flowing through the second conductor B to minimize the inductance in the conductors.

4. The system of claim 1, wherein the first conductor A is in electrical communication with the negative first section connector and the magnetic pulse power supply negative connection, the first conductor B is in electrical communication with the positive second section connector and the magnetic pulse power supply positive connection, the second conductor A is in electrical communication with the negative second section connector and the magnetic pulse power supply negative connection, and the second conductor B is in electrical communication with the positive first section connector and the magnetic pulse power supply positive connection, wherein in the operational position the positive first section connector is adjacent to the negative second section connector and is separated therefrom by a portion of the insulator and the positive second section connector is adjacent to the negative first section connector and is separated therefrom by a portion of the insulator, such that as current traverses from the magnetic pulse power supply to the positive first section connector through the second conductor B, passes through the first section, and returns to the magnetic pulse power supply through the first conductor A and as current traverses from the magnetic pulse power supply to the positive second section connector through the first conductor B, passes through the second section, and returns to the magnetic pulse power supply through the second conductor A, such that the current flowing at the first section working face is in a direction opposite the current flowing at the second section working face, the current flowing through the first conductor A is in the opposite direction of the current flowing through the first conductor B, and the current flowing through the second conductor A is in the opposite direction of the current flowing through the second conductor B to minimize the inductance in the conductors.

5. The system of claim 1, wherein the first conductor A is in electrical communication with the positive second section connector and the magnetic pulse power supply positive connection, the first conductor B is in electrical communication with the negative first section connector and the magnetic pulse power supply negative connection, the second conductor A is in electrical communication with the positive first section connector and the magnetic pulse power supply positive connection, and the second conductor B is in electrical communication with the negative second section connector and the magnetic pulse power supply negative connection, wherein in the operational position the positive first section connector is adjacent to the negative second section connector and is separated therefrom by a portion of the insulator and the positive second section connector is adjacent to the negative first section connector and is separated therefrom by a portion of the insulator, such that as current traverses from the magnetic pulse power supply to the positive first section connector through the second conductor A, passes through the first section, and returns to the magnetic pulse power supply through the first conductor B and as current traverses from the magnetic pulse power supply to the positive second section connector through the first conductor A, passes through the second section, and returns to the magnetic pulse power supply through the second conductor B, such that the current flowing at the first section working face is in a direction opposite the current flowing at the second section working face, the current flowing through the first conductor A is in the opposite direction of the current flowing through the first conductor B, and the current flowing through the second conductor A is in the opposite direction of the current flowing through the second conductor B to minimize the inductance in the conductors.

6. The system of claim 1, wherein the first conductor A is in electrical communication with the negative second section connector and the magnetic pulse power supply negative connection, the first conductor B is in electrical communication with the positive first section connector and the magnetic pulse power supply positive connection, the second conductor A is in electrical communication with the negative first section connector and the magnetic pulse power supply negative connection, and the second conductor B is in electrical communication with the positive second section connector and the magnetic pulse power supply positive connection, wherein in the operational position the positive first section connector is adjacent to the negative second section connector and is separated therefrom by a portion of the insulator and the positive second section connector is adjacent to the negative first section connector and is separated therefrom by a portion of the insulator, such that as current traverses from the magnetic pulse power supply to the positive first section connector through the first conductor B, passes through the first section, and returns to the magnetic pulse power supply through the second conductor A and as current traverses from the magnetic pulse power supply to the positive second section connector through the second conductor B, passes through the second section, and returns to the magnetic pulse power supply through the first conductor A, such that the current flowing at the first section working face is in a direction opposite the current flowing at the second section working face, the current flowing through the first conductor A is in the opposite direction of the current flowing through the first conductor B, and the current flowing through the second conductor A is in the opposite direction of the current flowing through the second conductor B to minimize the inductance in the conductors.

7. The system of claim 1, wherein the first conductor A is within approximately one inch of the first conductor B throughout substantially the length from the first distal end to the first proximal end, and the second conductor A is within approximately one inch of the second conductor B throughout substantially the length from the second distal end to the second proximal end, to minimize the inductance in the conductors.

8. The system of claim 1, wherein the first conductor A is substantially in contact with the first conductor B throughout substantially the length from the first distal end to the first proximal end, and the second conductor A is substantially in contact with the second conductor B throughout substantially the length from the second distal end to the second proximal end, to minimize the inductance in the conductors.

9. The system of claim 1, wherein the first pair of conductors is a first coaxial conductor and the first conductor A is a first interior conductor and the first conductor B is a first exterior conductor, and the second pair of conductors is a second coaxial conductor and the second conductor A is a second interior conductor and the second conductor B is a second exterior conductor, such that the current flowing in the first interior conductor is in a direction opposite the current flowing in the first exterior conductor and the current flowing in the second interior conductor is in a direction opposite the current flowing in the second exterior conductor to minimize the inductance in the conductors.

10. The system of claim 9, wherein the first interior conductor is in electrical communication with the positive first section connector and the magnetic pulse power supply positive connection, the first exterior conductor is in electrical communication with the negative second section connector and the magnetic pulse power supply negative connection, the second interior conductor is in electrical communication with the positive second section connector and the magnetic pulse power supply positive connection, and the second exterior conductor is in electrical communication with the negative first section connector and the magnetic pulse power supply negative connection, wherein in the operational position the positive first section connector is adjacent to the negative second section connector and is separated therefrom by a portion of the insulator and the positive second section connector is adjacent to the negative first section connector and is separated therefrom by a portion of the insulator, such that as current traverses from the magnetic pulse power supply to the positive first section connector through the first interior conductor, passes through the first section, and returns to the magnetic pulse power supply through the second exterior conductor and as current traverses from the magnetic pulse power supply to the positive second section connector through the second interior conductor, passes through the second section, and returns to the magnetic pulse power supply through the first exterior conductor such that the current flowing at the first section working face is in a direction opposite the current flowing at the second section working face, the current flowing through the first interior conductor is in the opposite direction of the current flowing through the first exterior conductor, and the current flowing through the second interior conductor is in the opposite direction of the current flowing through the second exterior conductor to minimize the inductance in the conductors.

11. The system of claim 9, wherein the first interior conductor is in electrical communication with the negative first section connector and the magnetic pulse power supply negative connection, the first exterior conductor is in electrical communication with the positive second section connector and the magnetic pulse power supply positive connection, the second interior conductor is in electrical communication with the negative second section connector and the magnetic pulse power supply negative connection, and the second exterior conductor is in electrical communication with the positive first section connector and the magnetic pulse power supply positive connection, wherein in the operational position the positive first section connector is adjacent to the negative second section connector and is separated therefrom by a portion of the insulator and the positive second section connector is adjacent to the negative first section connector and is separated therefrom by a portion of the insulator, such that as current traverses from the magnetic pulse power supply to the positive first section connector through the second exterior conductor, passes through the first section, and returns to the magnetic pulse power supply through the first interior conductor and as current traverses from the magnetic pulse power supply to the positive second section connector through the first exterior conductor, passes through the second section, and returns to the magnetic pulse power supply through the second interior conductor such that the current flowing at the first section working face is in a direction opposite the current flowing at the second section working face, the current flowing through the first interior conductor is in the opposite direction of the current flowing through the first exterior conductor, and the current flowing through the second interior conductor is in the opposite direction of the current flowing through the second exterior conductor to minimize the inductance in the conductors.

12. The system of claim 9, wherein the first interior conductor is in electrical communication with the positive second section connector and the magnetic pulse power supply positive connection, the first exterior conductor is in electrical communication with the negative first section connector and the magnetic pulse power supply negative connection, the second interior conductor is in electrical communication with the positive first section connector and the magnetic pulse power supply positive connection, and the second exterior conductor is in electrical communication with the negative second section connector and the magnetic pulse power supply negative connection, wherein in the operational position the positive first section connector is adjacent to the negative second section connector and is separated therefrom by a portion of the insulator and the positive second section connector is adjacent to the negative first section connector and is separated therefrom by a portion of the insulator, such that as current traverses from the magnetic pulse power supply to the positive first section connector through the second interior conductor, passes through the first section, and returns to the magnetic pulse power supply through the first exterior conductor and as current traverses from the magnetic pulse power supply to the positive second section connector through the first interior conductor, passes through the second section, and returns to the magnetic pulse power supply through the second exterior conductor, such that the current flowing at the first section working face is in a direction opposite the current flowing at the second section working face, the current flowing through the first interior conductor is in the opposite direction of the current flowing through the first exterior conductor, and the current flowing through the second interior conductor is in the opposite direction of the current flowing through the second exterior conductor to minimize the inductance in the conductors.

13. The system of claim 9, wherein the first interior conductor is in electrical communication with the negative second section connector and the magnetic pulse power supply negative connection, the first exterior conductor is in electrical communication with the positive first section connector and the magnetic pulse power supply positive connection, the second interior conductor is in electrical communication with the negative first section connector and the magnetic pulse power supply negative connection, and the second exterior conductor is in electrical communication with the positive second section connector and the magnetic pulse power supply positive connection, wherein in the operational position the positive first section connector is adjacent to the negative second section connector and is separated therefrom by a portion of the insulator and the positive second section connector is adjacent to the negative first section connector and is separated therefrom by a portion of the insulator, such that as current traverses from the magnetic pulse power supply to the positive first section connector through the first exterior conductor, passes through the first section, and returns to the magnetic pulse power supply through the second interior conductor and as current traverses from the magnetic pulse power supply to the positive second section connector through the second exterior conductor, passes through the second section, and returns to the magnetic pulse power supply through the first interior conductor, such that the current flowing at the first section working face is in a direction opposite the current flowing at the second section working face, the current flowing through the first interior conductor is in the opposite direction of the current flowing through the first exterior conductor, and the current flowing through the second interior conductor is in the opposite direction of the current flowing through the second exterior conductor to minimize the inductance in the conductors.

14. The system of claim 1, wherein the first section further includes at least one first section current path control device and the second section further includes at least one second section current path control device.

15. The system of claim 14, wherein the at least one first section current path control device is a first insulating barrier that reduces the potential current paths through the first section such that the current is directed to the first working face, and the at least one second section current path control device is a second insulating barrier that reduces the potential current paths through the second section such that the current is directed to the second working face.

16. The system of claim 15, wherein the first insulating barrier comprises a first ingress barrier and a first egress barrier wherein the first ingress barrier directs current to the portion of the first working face between the positive first section connector and the first workpiece recess section and the first egress barrier directs current to the portion of the first working face between the first workpiece recess section and the negative first section connector, and the second insulating barrier comprises a second ingress barrier and a second egress barrier wherein the second ingress barrier directs current to the portion of the second working face between the positive second section connector and the second workpiece recess section and the second egress barrier directs current to the portion of the second working face between the second workpiece recess section and the negative second section connector.

17. An opposed current flow magnetic pulse forming and joining system in electrical communication with a magnetic pulse power supply having a positive connection and a negative connection for forming or joining a workpiece or workpieces in which a portion of the system may be separated from the remainder of the system to facilitate ingress and egress of the workpiece or workpieces, comprising:

a first section having a first section working face with a first workpiece recess section, a positive first section connector, and a negative first section connector;

a second section having a second section working face with a second workpiece recess section, a positive second section connector, and a negative second section connector;

an insulator in contact with a portion of the first section working face and the second section working face, the insulator blocking current flow between the first section and the second section and being releasable so that the first section, the insulator, and the second section may be moved independently and separated from one another to allow ingress of the workpiece or workpieces into the area bounded by the first workpiece recess section and the second workpiece recess section;

a first coaxial conductor having a first distal end and a first proximal end and having an first interior conductor and a first exterior conductor, the first distal end in electrical communication with the magnetic pulse power supply and the first proximal end in electrical communication with the first section and the second section;

a second coaxial conductor having a second distal end and a second proximal end and having a second interior conductor and a second exterior conductor, the second distal end in electrical communication with the magnetic pulse power supply and the second proximal end in electrical communication with the first section and the second section; and wherein when the system is in a operational position with the first section working face substantially parallel with the second section working face and a portion of each working face is in contact with the insulator, the first coaxial conductor and the second coaxial conductor are configured to complete a first electrical circuit between the first section and the magnetic pulse power supply and a second electrical circuit between the second section and the magnetic pulse power supply such that current flowing at the first section working face is in a direction opposite the current flowing at the second section working face, and the current flowing in the first interior conductor is in a direction opposite the current flowing in the first exterior conductor and the current flowing in the second interior conductor is in a direction opposite the current flowing in the second exterior conductor to minimize the inductance in the conductors and generate an electromagnetic force from the first and second workpiece recess sections that may be used in magnetic pulse forming and joining.

18. The system of claim 17, wherein the first interior conductor is in electrical communication with the positive first section connector and the magnetic pulse power supply positive connection, the first exterior conductor is in electrical communication with the negative second section connector and the magnetic pulse power supply negative connection, the second interior conductor is in electrical communication with the positive second section connector and the magnetic pulse power supply positive connection, and the second exterior conductor is in electrical communication with the negative first section connector and the magnetic pulse power supply negative connection, wherein in the operational position the positive first section connector is adjacent to the negative second section connector and is separated therefrom by a portion of the insulator and the positive second section connector is adjacent to the negative first section connector and is separated therefrom by a portion of the insulator, such that as current traverses from the magnetic pulse power supply to the positive first section connector through the first interior conductor, passes through the first section, and returns to the magnetic pulse power supply through the second exterior conductor and as current traverses from the magnetic pulse power supply to the positive second section connector through the second interior conductor, passes through the second section, and returns to the magnetic pulse power supply through the first exterior conductor such that the current flowing at the first section working face is in a direction opposite the current flowing at the second section working face, the current flowing through the first interior conductor is in the opposite direction of the current flowing through the first exterior conductor, and the current flowing through the second interior conductor is in the opposite direction of the current flowing through the second exterior conductor to minimize the inductance in the conductors.

19. The system of claim 17, wherein the first interior conductor is in electrical communication with the negative first section connector and the magnetic pulse power supply negative connection, the first exterior conductor is in electrical communication with the positive second section connector and the magnetic pulse power supply positive connection, the second interior conductor is in electrical communication with the negative second section connector and the magnetic pulse power supply negative connection, and the second exterior conductor is in electrical communication with the positive first section connector and the magnetic pulse power supply positive connection, wherein in the operational position the positive first section connector is adjacent to the negative second section connector and is separated therefrom by a portion of the insulator and the positive second section connector is adjacent to the negative first section connector and is separated therefrom by a portion of the insulator, such that as current traverses from the magnetic pulse power supply to the positive first section connector through the first exterior conductor, passes through the first section, and returns to the magnetic pulse power supply through the second interior conductor and as current traverses from the magnetic pulse power supply to the positive second section connector through the second exterior conductor, passes through the second section, and returns to the magnetic pulse power supply through the first interior conductor such that the current flowing at the first section working face is in a direction opposite the current flowing at the second section working face, the current flowing through the first interior conductor is in the opposite direction of the current flowing through the first exterior conductor, and the current flowing through the second interior conductor is in the opposite direction of the current flowing through the second exterior conductor to minimize the inductance in the conductors.

20. The system of claim 17, wherein the first interior conductor is in electrical communication with the positive second section connector and the magnetic pulse power supply positive connection, the first exterior conductor is in electrical communication with the negative first section connector and the magnetic pulse power supply negative connection, the second interior conductor is in electrical communication with the positive first section connector and the magnetic pulse power supply positive connection, and the second exterior conductor is in electrical communication with the negative second section connector and the magnetic pulse power supply negative connection, wherein in the operational position the positive first section connector is adjacent to the negative second section connector and is separated therefrom by a portion of the insulator and the positive second section connector is adjacent to the negative first section connector and is separated therefrom by a portion of the insulator, such that as current traverses from the magnetic pulse power supply to the positive first section connector through the second interior conductor, passes through the first section, and returns to the magnetic pulse power supply through the first exterior conductor and as current traverses from the magnetic pulse power supply to the positive second section connector through the first interior conductor, passes through the second section, and returns to the magnetic pulse power supply through the second exterior conductor, such that the current flowing at the first section working face is in a direction opposite the current flowing at the second section working face, the current flowing through the first interior conductor is in the opposite direction of the current flowing through the first exterior conductor, and the current flowing through the second interior conductor is in the opposite direction of the current flowing through the second exterior conductor to minimize the inductance in the conductors.

21. The system of claim 17, wherein the first interior conductor is in electrical communication with the negative second section connector and the magnetic pulse power supply negative connection, the first exterior conductor is in electrical communication with the positive first section connector and the magnetic pulse power supply positive connection, the second interior conductor is in electrical communication with the negative first section connector and the magnetic pulse power supply negative connection, and the second exterior conductor is in electrical communication with the positive second section connector and the magnetic pulse power supply positive connection, wherein in the operational position the positive first section connector is adjacent to the negative second section connector and is separated therefrom by a portion of the insulator and the positive second section connector is adjacent to the negative first section connector and is separated therefrom by a portion of the insulator, such that as current traverses from the magnetic pulse power supply to the positive first section connector through the first exterior conductor, passes through the first section, and returns to the magnetic pulse power supply through the second interior conductor and as current traverses from the magnetic pulse power supply to the positive second section connector through the second exterior conductor, passes through the second section, and returns to the magnetic pulse power supply through the first interior conductor, such that the current flowing at the first section working face is in a direction opposite the current flowing at the second section working face, the current flowing through the first interior conductor is in the opposite direction of the current flowing through the first exterior conductor, and the current flowing through the second interior conductor is in the opposite direction of the current flowing through the second exterior conductor to minimize the inductance in the conductors.

22. An opposed current flow magnetic pulse forming and joining system in electrical communication with a magnetic pulse power supply having a positive connection and a negative connection for forming or joining a workpiece or workpieces in which a portion of the system may be separated from the remainder of the system to facilitate ingress and egress of the workpiece or workpieces, comprising:

a first section having a first section working face with a first workpiece recess section, a positive first section connector, and a negative first section connector, wherein the positive first section connector and the negative first section connector are in contact with a portion of the first working face;

a second section having a second section working face with a second workpiece recess section, a positive second section connector, and a negative second section connector, wherein the positive second section connector and the negative second section connector are in contact with a portion of the second working face;

an insulator in contact with a portion of the first section working face and the second section working face, the insulator blocking current flow between the first section and the second section and being releasable so that the first section, the insulator, and the second section may be moved independently and separated from one another to allow ingress of the workpiece or workpieces into the area bounded by the first workpiece recess section and the second workpiece recess section;

a first coaxial conductor having a first distal end and a first proximal end and having an first interior conductor and a first exterior conductor, the first distal end in electrical communication with the magnetic pulse power supply and the first proximal end in electrical communication with the first section and the second section;

a second coaxial conductor having a second distal end and a second proximal end and having a second interior conductor and a second exterior conductor, the second distal end in electrical communication with the magnetic pulse power supply and the second proximal end in electrical communication with the first section and the second section; and wherein when the system is in a operational position with the first section working face substantially parallel with the second section working face and a portion of each working face is in contact with the insulator, the first coaxial conductor and the second coaxial conductor are configured to complete a first electrical circuit between the first section and the magnetic pulse power supply and a second electrical circuit between the second section and the magnetic pulse power supply such that current flowing at the first section working face is in a direction opposite the current flowing at the second section working face, and the current flowing in the first interior conductor is in a direction opposite the current flowing in the first exterior conductor and the current flowing in the second interior conductor is in a direction opposite the current flowing in the second exterior conductor and generate an electromagnetic force from the first and second workpiece recess sections that may be used in magnetic pulse forming and joining.

* * * * *